US008837339B2

(12) United States Patent  (10) Patent No.: US 8,837,339 B2
Sakai  (45) Date of Patent: Sep. 16, 2014

(54) ACCESS POINT AND CONTROL METHOD THEREOF

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/303,801

(22) Filed: Nov. 23, 2011

(65) Prior Publication Data

US 2012/0134309 A1    May 31, 2012

(30) Foreign Application Priority Data

Nov. 29, 2010  (JP) .................................. 2010-265097

(51) Int. Cl.
*G08C 17/00*    (2006.01)
*H04W 52/02*    (2009.01)

(52) U.S. Cl.
CPC ............ *H04W 52/0206* (2013.01); *Y02B 60/50* (2013.01)
USPC ............ 370/311; 370/312; 370/328; 370/338

(58) Field of Classification Search
CPC ........................ H04W 52/0206; H04W 76/046
See application file for complete search history.

(56) References Cited

U.S. PATENT DOCUMENTS

| 2004/0224642 | A1* | 11/2004 | Kim et al. ...................... 455/74.1 |
| 2008/0192698 | A1* | 8/2008 | Rue ................................ 370/331 |
| 2009/0252073 | A1* | 10/2009 | Kim et al. ...................... 370/311 |
| 2009/0305708 | A1* | 12/2009 | Matsui et al. .................. 455/445 |

FOREIGN PATENT DOCUMENTS

| JP | 2006-025022 A | 1/2006 |
| JP | 2009-239371 A | 10/2009 |
| WO | 2006/018898 A1 | 2/2006 |

* cited by examiner

*Primary Examiner* — David Oveissi
(74) *Attorney, Agent, or Firm* — Canon USA, Inc., I.P. Division

(57) ABSTRACT

A communication apparatus confirms a connection state with a terminal apparatus, the information about which is stored in a storage unit, when the communication apparatus is switched from a power saving communication mode to a normal communication mode. When the communication apparatus confirms that all of the terminal apparatuses have disengaged from a network, the communication apparatus ends its operations as a base station, and notifies a user of the disengagement.

13 Claims, 7 Drawing Sheets

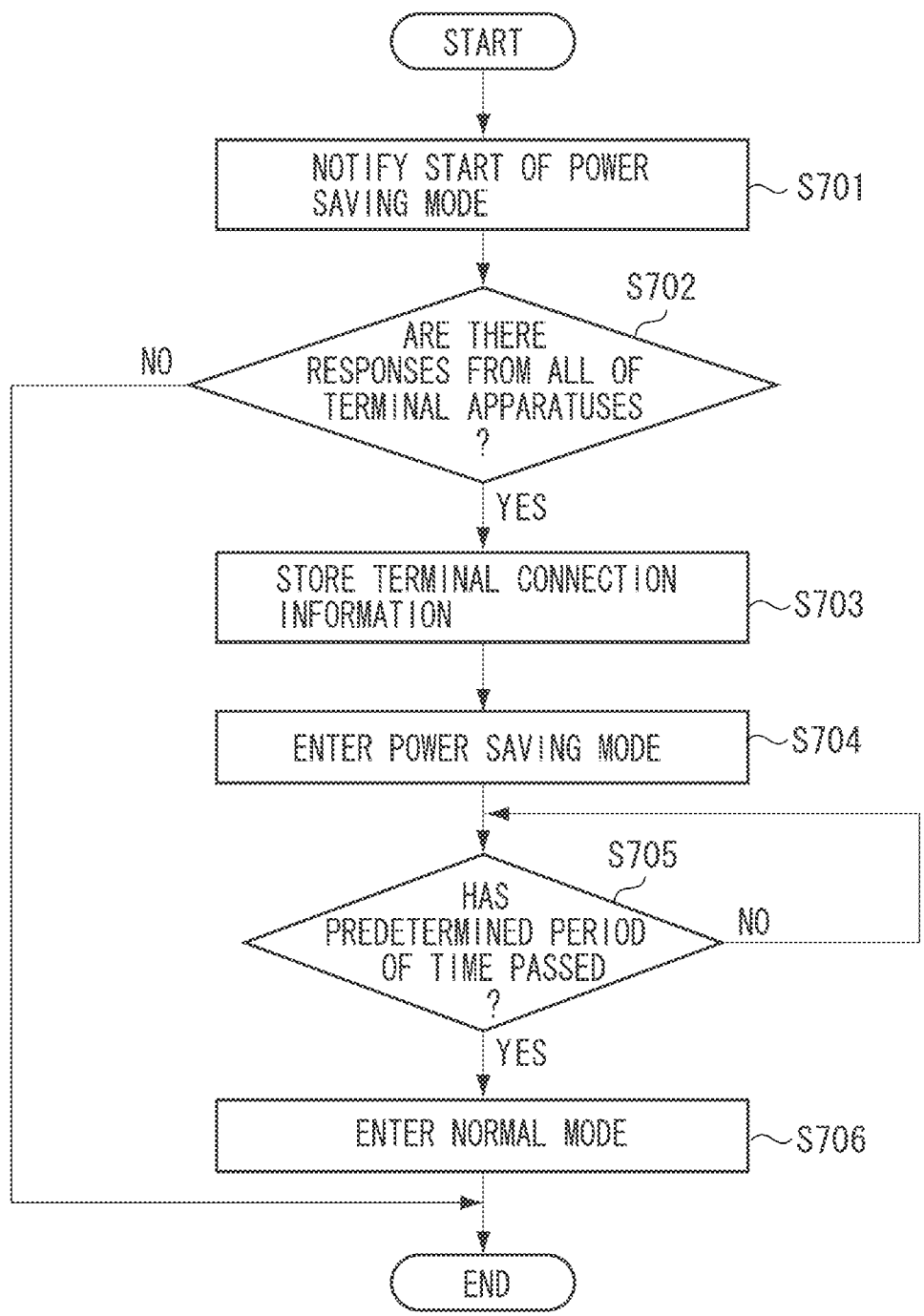

ACCESS POINT AND CONTROL METHOD THEREOF

BACKGROUND OF THE INVENTION

1. Field of the Invention

The present invention relates to an access point that communicates with a communication apparatus.

2. Description of the Related Art

In wireless communications such as a wireless local area network (LAN) conforming to Institute of Electrical and Electronic Engineers (IEEE) 802.11 series, a power saving mode is defined as a mode that suppresses power consumption in a communication apparatus.

As one of method of achieving a power-saving communication mode, saving the power of an access point (base station) has been discussed. For example, Japanese Patent Application Laid-Open No. 2004-336401 discusses a system in which an access point notifies, in advance, its terminal apparatus of a period of time when no data is transmitted/received. During the period, the access point operates in a sleep mode in which the wireless communication unit of the access point stops its function to save power of the access point.

In the power-saving communication mode, the access point in the sleep mode cannot transfer/receive messages to/from its terminal apparatus. As a result, when the terminal apparatus disengages from the network where the access point and the terminal apparatus belong, the access point cannot immediately detect the disengagement because the access point in the sleep mode cannot receive the disengagement message from the terminal apparatus.

Due to the above inconvenience, especially when the access point is a mobile device such as a laptop or a smartphone, the user of the device cannot have precise information about the state of a terminal apparatus that is a communication partner of the device, which is not user friendly.

SUMMARY OF THE INVENTION

The present invention is directed to improving user friendliness of a communication apparatus that operates as an access point.

According to an aspect of the present invention, an access point that communicates with at least one communication apparatus is provided. The access point includes an output unit and a control unit, where the control unit controls a power saving control unit configured to switch the access point between an active mode and a power saving mode, a check unit configured to request, after the access point is switched from the power saving mode to the active mode, a response from the at least one communication apparatus connected to the access point before the access point is switched to the power saving mode and to confirm, based on the response to the request, connection between the access point and the at least one communication apparatus after the access point is switched from the power saving mode to the active mode, and the output unit is configured to output a confirmation result.

The present invention allows an access point to immediately confirm a connection state between the access point and its terminal apparatus when the access point enters an active mode from a power saving mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a flowchart of a process to switch between a power saving mode and an active mode.

DESCRIPTION OF THE EMBODIMENTS

Various exemplary embodiments, features, and aspects of the invention will be described in detail below with reference to the drawings.

A communication apparatus according to an exemplary embodiment is described in detail with reference to the drawings. The present exemplary embodiment is using a wireless LAN system based on IEEE 802.11 series, but other communication systems may also be used.

Figure 1:
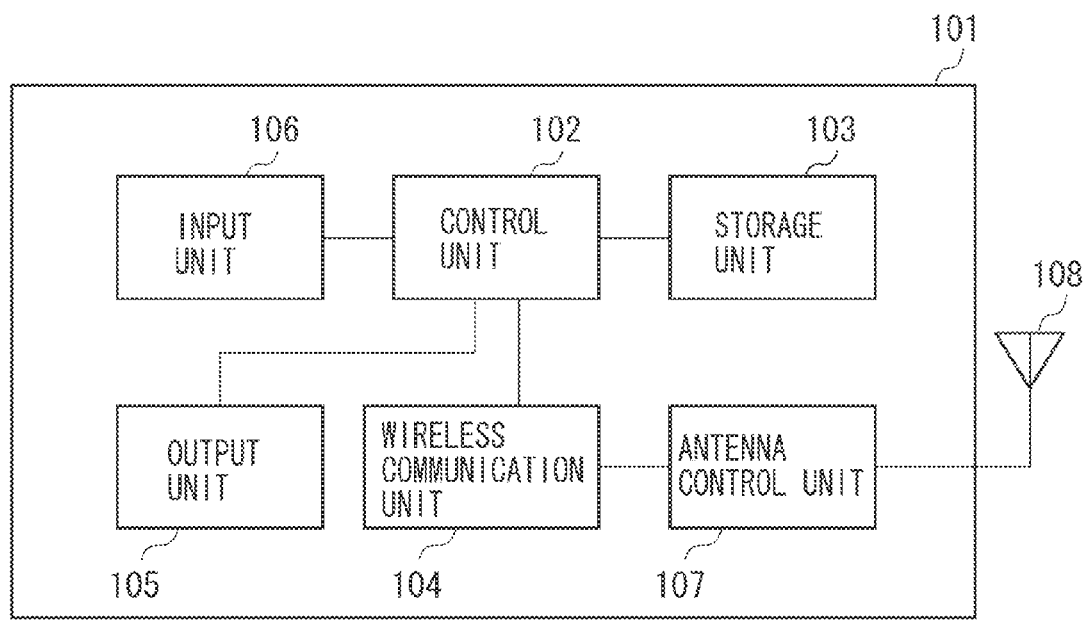
FIG. 1 is a structural block diagram illustrating a communication apparatus according to an exemplary embodiment of the present invention.
Figure 4:
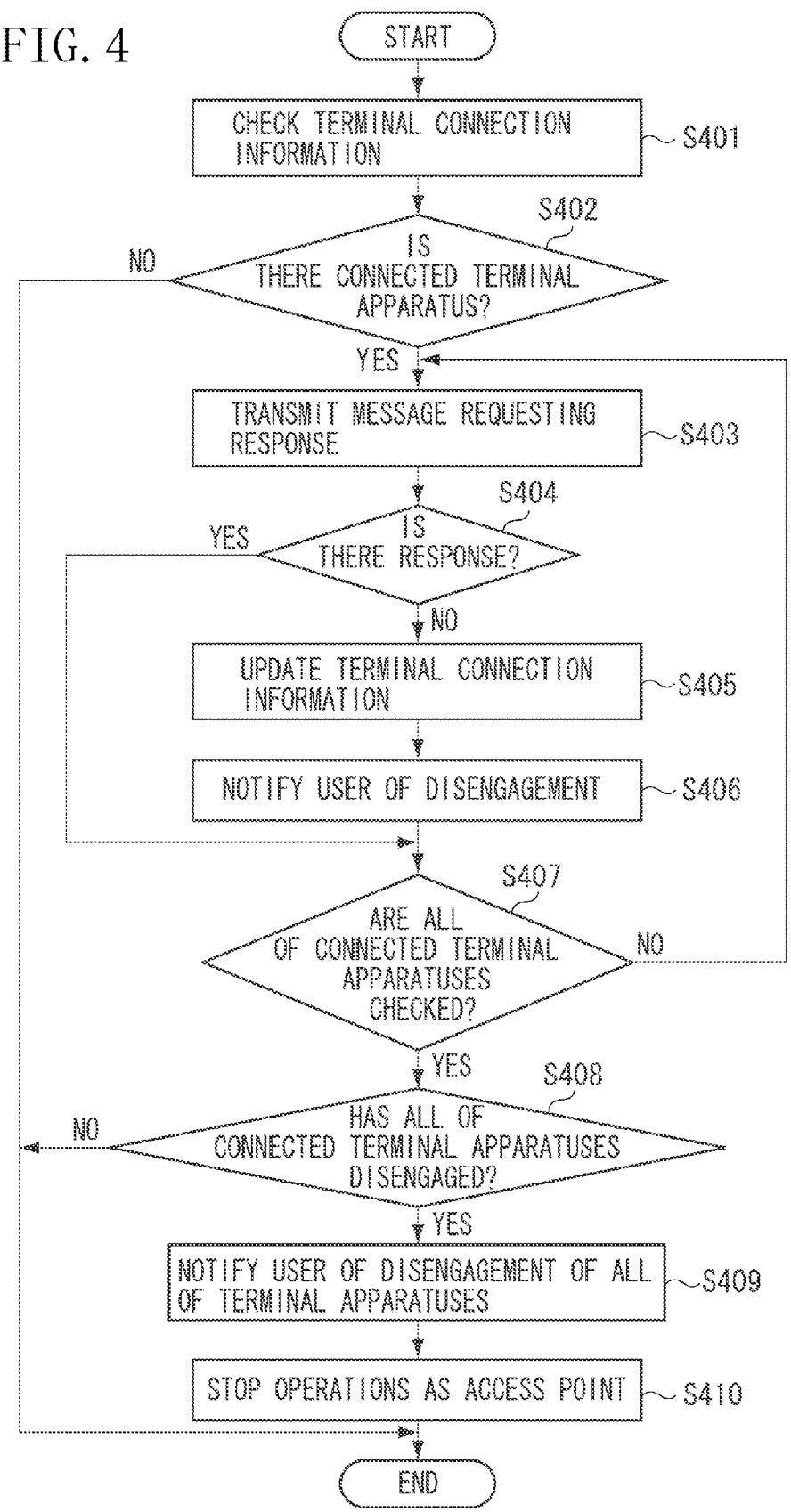
FIG. 4 illustrates a flowchart of a process to confirm a connection state.

FIG. 1 is a block diagram illustrating a structure of a communication apparatus according to an exemplary embodiment. A communication apparatus 101 includes a control unit 102, a storage unit 103, a wireless communication unit 104, an output unit 105, an input unit 106, an antenna control unit 107, and an antenna 108. The control unit 102 controls the entire apparatus by executing control programs stored in the storage unit 103. The control unit 102 includes operation devices such as a central processing unit (CPU) and a micro processing unit (MPU), and implements functions as described below by operating and processing various information and controlling the hardware. The control unit 102 also controls automatic parameter setting for communication between the communication apparatus and other apparatuses. The storage unit 103 stores computer control programs executed by the control unit 102, and various information including the communication parameters. The operations as described below are performed when the control unit 102 executes the control programs stored in the storage unit 103. The program as described below to execute the process to confirm a connection state illustrated in FIG. 4 is also stored in the storage unit 103. The storage unit 103 may include memories such as read only memory (ROM) and random access memory (RAM), floppy disk, hard disk, optical disk, magneto-optical disk, CD-ROM, CD-R, magnetic tape, non-volatile memory card, and DVD.

The wireless communication unit 104 is configured to achieve wireless communication, and includes a wireless chip to achieve wireless communication based on IEEE 802.11. The output unit 105 includes an interface to output various information, and is able to output an instruction for emitting light to an element incorporated therein that is visibly recognizable such as a light emitting diode (LED), outputting video signals to a display device such as a liquid crystal display (LCD), or outputting sound to an audio device such as a speaker. The output unit 105 outputs to a user result of a connection confirming process as described below. The LED, the LCD, and the speaker may be incorporated in the communication apparatus 101, or may be connected to the communication apparatus 101 through the output unit 105. The input unit 106 includes operation buttons through which a user inputs instructions. The antenna control unit 107 obtains signals from the antenna 108 and supplies them to the wireless communication unit 104, and also obtains signals from the wireless communication unit 104 and supplies them to the antenna 108. The antenna 108 is used to transmit/receive high-frequency signals.

Figure 2:
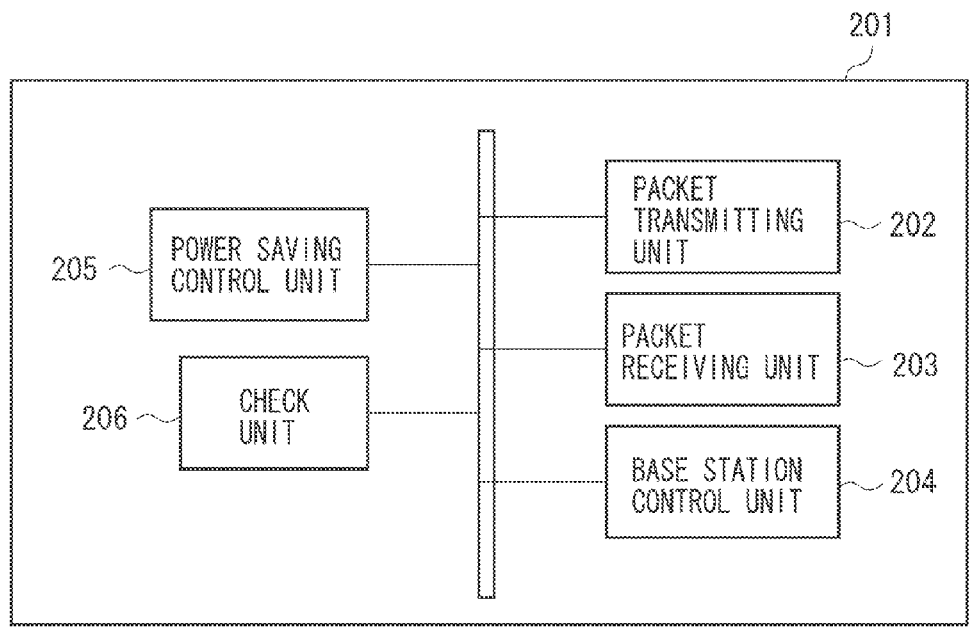
FIG. 2 is a functional block diagram illustrating a communication apparatus according to an exemplary embodiment of the present invention.

A functional block of a communication apparatus is described with reference to FIG. 2, and is realized when the control unit 102 executes the control programs stored in the storage unit 103 and controls the hardware of the communication apparatus 101 individually. In FIG. 2, the communication apparatus 101 includes a packet transmitting unit 202 configured to transmit packets for communications. The transmission of various signals as described below is performed by the packet transmitting unit 202. The communication apparatus 101 includes a packet receiving unit 203 configured to receive packets for communications. The receipt of various signals as described below is performed by the packet receiving unit 203. The communication apparatus 101 further includes a base station control unit 204 configured to control operations of the communication apparatus 101 as an access point (base station). Specifically, processing operations of the communication apparatus 101 as an access point within a wireless LAN network are performed by the base station control unit 204. Examples of the processing operations include transmission of beacon signals, and connection of the communication apparatus 101 to one or more terminal apparatuses. The term "access point" refers to a control apparatus that establishes a network and controls the network.

The communication apparatus 101 further includes a power saving control unit 205 configured to control power saving communication of the access point. The power saving control unit 205 controls power supply to each unit of the access point, and performs a process described below to switch between a power saving mode and an active mode of the access point. The power saving mode of the present exemplary embodiment is a sleep mode in which no power is supplied to communication circuits, but is not limited to the sleep mode. In other words, the power saving mode can be a state that enables power saving by smaller power transmission or increased intervals between transmissions of control packets. The term "active mode" refers to a non-power saving mode in which the communication apparatus 101 can communicate with one or more terminal apparatuses. The term "power saving mode" refers to a state in which power consumption is smaller than that in the active mode. The communication apparatus 101 further includes a check unit 206 configured to confirm a connection state of the communication apparatus 101 with one or more terminal apparatuses. The check unit 206 transmits a response request to the terminal apparatuses to determine a connection state of the communication apparatus 101 based on the response from the terminals. The check unit 206 performs a connection confirming process described below.

Figure 3:
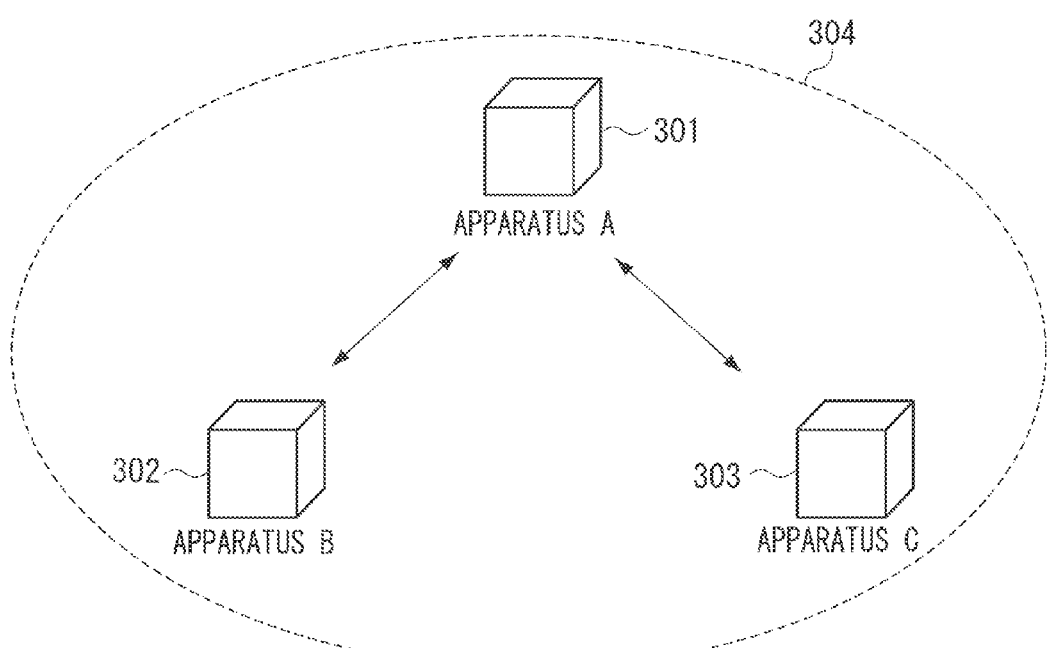
FIG. 3 illustrates a network structure.

Operations of the communication apparatus 101 having the above configuration is described. FIG. 3 illustrates a network 304 having an apparatus A 301, an apparatus B 302, and an apparatus C 303. The apparatus A 301 has the configurations of the communication apparatus 101 illustrated in FIGS. 1 and 2. The apparatus A 301 operates as an access point, and establishes the network 304 to communicate with the apparatus B 302 and the apparatus C 303. The apparatus B 302 and the apparatus C 303 each operate as a terminal apparatus, and are connected to the network 304, which is established by the apparatus A 301, to communicate with the apparatus A 301.

The apparatus A 301, when connected to the terminal apparatuses (e.g., the apparatus B 302 and the apparatus C 303), stores information of the terminal apparatuses that is necessary for communication, such as a media access control (MAC) address, as terminal connection information in the storage unit 103 of the apparatus A 301.

A process is described with reference to the flowchart in FIG. 7, in which the apparatus A 301, as an access point that is able to communicate with the apparatus B 302 and the apparatus C 303 within the network in FIG. 3, enters a power saving mode.

In step S701, when the switching process to the power saving mode starts, the power saving control unit 205 of the apparatus A 301 transmits a message about start of the power saving mode to the terminal apparatuses (e.g., the apparatus B 302 and the apparatus C 303) within the network through the packet transmitting unit 202. The start message contains information about a period of time for the power saving mode. In step S702, the power saving control unit 205 determines whether the apparatus A 301 has received a response to the start message from each of the terminal apparatuses. If the power saving control unit 205 does not receive a response signal from any of the terminal apparatuses within the network (No in step S702), the power saving control unit 205 ends the process. In step S703, when the power saving control unit 205 has received a response from each of the terminal apparatuses within the network (Yes in step S702), the power saving control unit 205 stores terminal connection information in the storage unit 103, which indicates the current structure of the network. In the example illustrated in FIG. 3, the power saving control unit 205 stores terminal connection information that indicates the apparatus B 302 and the apparatus C 303 still belong to the network.

In step S704, the power saving control unit 205 stops power supply to communication circuits incorporated in the apparatus A 301 to make the apparatus A 301 enter a sleep mode, which switches the active mode to the power saving mode. In step S705, the power saving control unit 205 determines whether the period of time for the power saving mode notified by the start message has passed. If the period of time for the power saving mode has passed (YES in step S705), in step S706, the power saving control unit 205 resumes power supply to the communication circuits, which switches the power saving mode to the normal state (i.e., the active mode).

A connection state confirming process is described with reference to the flowchart illustrated in FIG. 4. The process starts when the apparatus A 301 in step S706 in FIG. 7 in the sleep mode, which is the power saving mode, enters the normal state (i.e., the active mode).

In step S401, the check unit 206 confirms the terminal connection information stored in the storage unit 103 when the apparatus A 301 in the power saving mode enters the normal state (i.e., the active mode). In step S402, if the apparatus A 301 is not connected to any terminal apparatus before the apparatus A 301 entered the power saving mode, the check unit 206 ends the confirming process. In step S403, if the apparatus A 301 is connected to one or more terminal apparatuses before the apparatus A 301 entered the power saving mode (Yes in step S402), the check unit 206 transmits a response request message to the terminal apparatuses. In step S403, the check unit 206 waits for responses to the message for a predetermined period of time. The present exemplary embodiment is described with a group key exchange message as an example of the response request message.

In step S404, if a response to the group key exchange message is received from a terminal apparatus within the predetermined period time (YES in step S403), the check unit 206 recognizes connection of the terminal apparatus to the network. If no response to the group key exchange message is received from terminal apparatuses within the predetermined period time (NO in step S403), the check unit 206 recognizes disengagement of the terminal apparatuses from the network. In step S405, the check unit 206 updates the terminal connection information by deleting information about the terminal apparatuses from the terminal connection information stored in the storage unit 103. In step S406, upon the recognition of the disengagement of the terminal apparatuses from the network, the check unit 206 notifies a user of the disengagement (disconnection) of the terminal apparatuses, through the output unit 105. For example, the output unit 105 outputs video information or audio information that contains a message such as "Terminal Apparatus B is Disconnected from Network", where the information is displayed on the LCD or sound outputted through the speaker.

In step S407, the check unit 206 determines whether recognition of a connection state using the above-described group key exchange message is made with respect to each of the terminal apparatuses the information of which is stored in the terminal connection information. If the recognition is not made yet with respect to each of the terminal apparatuses the information of which is stored in the terminal connection information (NO in step S407), the check unit 206 repeats the processes from step S403 to step S407 until the recognition for all of the terminal apparatuses is made. If the recognition is made with respect to all of the terminal apparatuses (YES in step S407), in step S408, the check unit 206 refers to the terminal connection information stored in the storage unit 103 to confirm whether all of the terminal apparatuses have disengaged from the network. If all of the terminal apparatuses have disengaged (YES in step S408), in step S409, the output unit 105 outputs, to a user, a message saying all of the terminal apparatuses have already disengaged as a result of the connection confirming process. For example, the output unit 105 outputs video information or audio information that contains a message such as "All of Terminal Apparatuses are Disconnected from Network," to be displayed on the LCD or sound outputted through the speaker. In step S410, the base station control unit 204 suspends the operations of the apparatus A 301 as an access point to disconnect the network.

Herein, the suspension of operations of a communication apparatus as an access point means that no more operations are carried out by the communication apparatus that are necessary to maintain the network that the communication apparatus currently provides. For example, when the operations as an access point are suspended, the communication apparatus stops transmission of beacon (notification) signals. In addition, when the operations as an access point are suspended, the communication apparatus disconnects the network which the apparatus established, and does not relay communication between the terminal apparatuses that have been connected.

The output unit 105 may be further configured to output information about suspension of the operations as an access point. The check unit 206 then ends the confirming process. When the apparatus A 301 is still connected to one or more terminal apparatuses, the check unit 206 ends the confirming process while continuing the operations as an access point.

Figure 5:
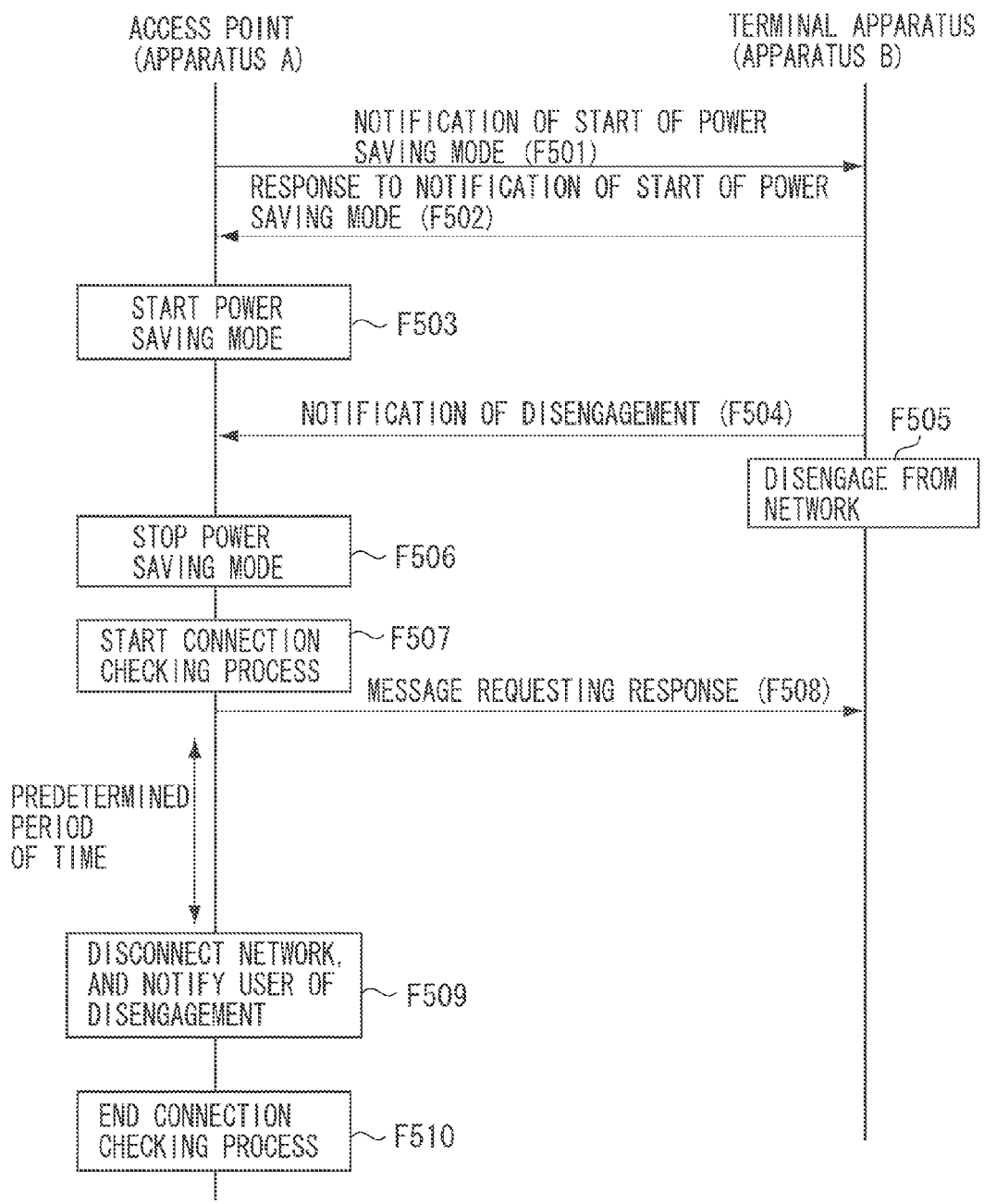
FIG. 5 illustrates an operation sequence of apparatuses A and B according to an exemplary embodiment of the present invention.

FIG. 5 illustrates an operation sequence of the above-described connection confirming process for a network where an access point (i.e., the apparatus A 301) is connected to only one terminal apparatus. FIG. 5 illustrates a case where, while an access point is in a power saving mode, a terminal apparatus disengages from the network. In step F501, the apparatus A 301, as an access point, transmits a start-notification indicating entrance of the apparatus A 301 to a power saving mode, to the apparatus B 302 that is the terminal apparatus connected to the network. The start-notification contains at least information about the period of time the apparatus A 301 stays in the power saving mode. In step F502, the apparatus A 301 receives a response message to the start notification from the apparatus B 302. In step F503, the apparatus A 301 stops power supply to the communication circuits, and enters a sleep mode. In step F504, the apparatus B 302 transmits, at the time of its disengagement from the network, a disengagement notification to the apparatus A 301. In step F505, the apparatus B 302 disengages from the network. The apparatus A 301, while in the sleep mode, cannot receive the disengagement notification transmitted from the apparatus B 302, and cannot detect the disengagement of the apparatus B 302 from the network. The apparatus B 302, which has been notified that the apparatus A 301 is in the sleep mode by the start-notification received in step F501, may disengage from the network without transmitting any disengagement notification to the apparatus A 301.

In step F506, the apparatus A 301 enters the active mode from the power saving mode after the notified period of time for the power saving has passed. The apparatus A 301 then resumes power supply to the communication circuits, and becomes able to transmit/receive messages and the like in the active mode. In step F507, the apparatus A 301 starts the process to confirm a connection state, after entering the active mode from the power saving mode. In step F508, the apparatus A 301 transmits a response request to the apparatus B 302 that is connected to the network before the apparatus A 301 enters the power saving mode. The apparatus A 301 waits for a response from the apparatus B 302 for a predetermined period of time. When the apparatus A 301 does not receive a response from the apparatus B 302 within the period of time, the apparatus A 301 determines that the apparatus B 302 disengaged from the network. Since no terminal is connected to the network, in step F509, the apparatus A 301 ends the operations as an access point, and disconnects the network. In step F509, the apparatus A 301 also notifies a user of the disengagement of the terminal apparatus B 302 connected to the network and the disconnection of the network, as a result of the confirming process. In step F510, the apparatus A 301 ends the confirming process.

Figure 6:
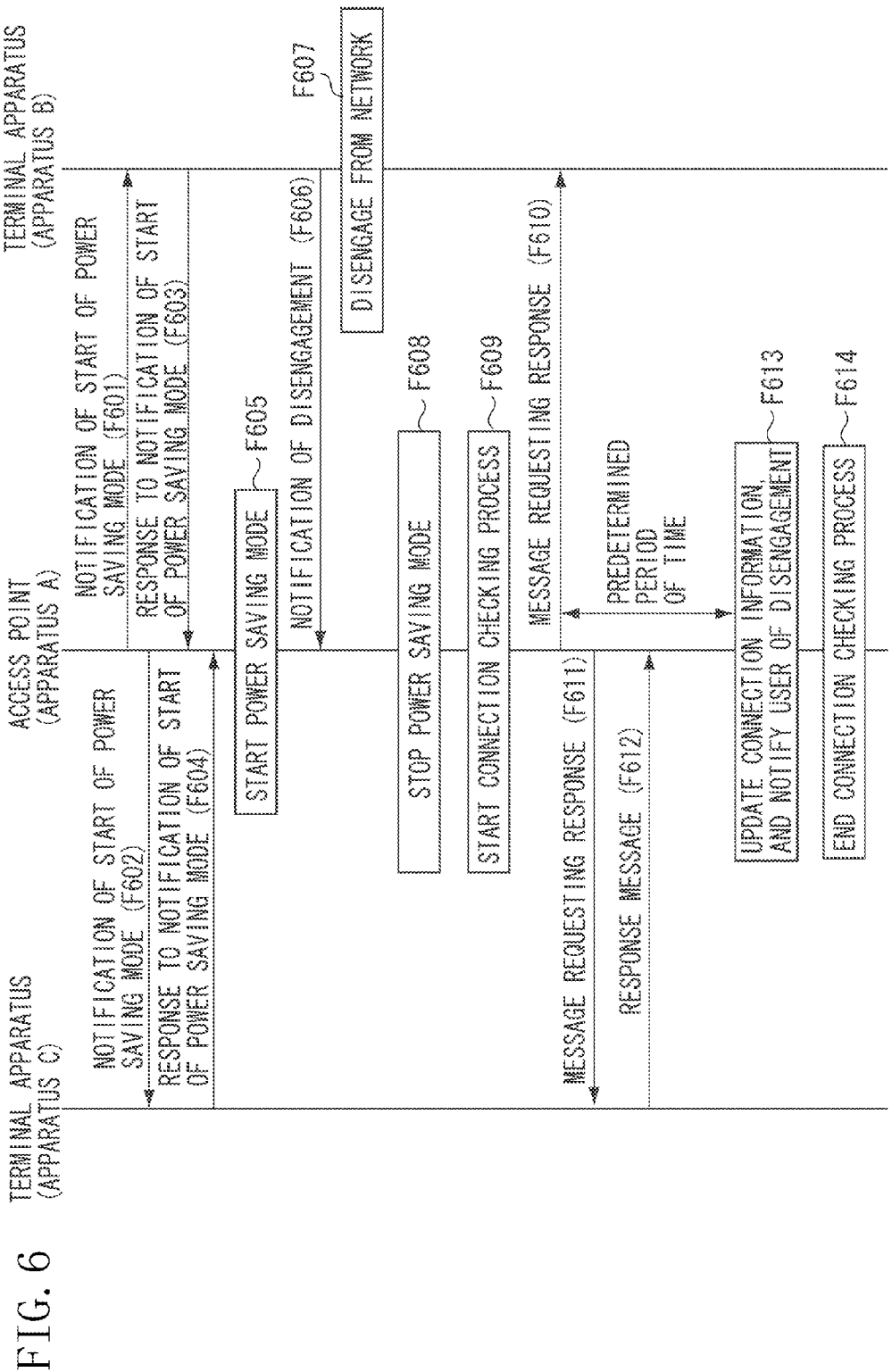
FIG. 6 illustrates an operation sequence of apparatuses A, B, and C according to an exemplary embodiment of the present invention.

FIG. 6 illustrates an operation sequence of the above-described connection confirming process for a network established between an access point (i.e., the apparatus A 301), the apparatus B 302, and the apparatus C 303. FIG. 6 illustrates a case where, while the access point is in a power saving mode, the apparatus B 302 disengages from the network.

In steps F601 and F602, the apparatus A 301 as an access point respectively transmits a start-notification indicating entrance of the apparatus A 301 to a power saving mode, to the apparatus B 302 and the apparatus C 303 connected to the network. In steps F603 and F604, the apparatus A 301 respectively receives a response message to the start notification from the apparatus B 302 and the apparatus C 303. In step F605, the apparatus A 301 stops power supply to the communication circuits therein, and enters a sleep mode. In step F606, the apparatus B 302 transmits, at the time of its disengagement from the network, a disengagement notification to the apparatus A 301. In step F607, the apparatus B 302 disengages from the network. The apparatus A 301, while in the sleep mode, cannot receive the disengagement notification transmitted from the apparatus B 302, and cannot detect the disengagement of the apparatus B 302 from the network.

In step F608, the apparatus A 301 enters the active mode from the power saving mode after the notified period of time for the power saving has passed. The apparatus A 301 then resumes power supply to the communication circuits, and becomes able to transmit/receive messages and the like in the active mode. In step F609, the apparatus A 301 starts the process to confirm a connection state, after entering the active mode from the power saving mode. In steps F610 and F611, the apparatus A 301 respectively transmits a response request to the apparatus B 302 and the apparatus C 303 that are connected to the network before the apparatus A 301 enters the power saving mode. The apparatus A 301 waits for a response from each of the apparatus B 302 and the apparatus C 303 for a predetermined period of time.

In step F612, the apparatus C 303, which is still connected to the network 304 when the response request message is received from the apparatus A 301, responds to the message. In step F612, upon receipt of the response from the apparatus C 303, the apparatus A 301 confirms the connection of the apparatus C 303 to the network. When the apparatus A 301 does not receive a response from the apparatus B 302 within the predetermined period of time, the apparatus A 301 determines that the apparatus B 302 has disengaged from the network. In step F613, the apparatus A 301 updates the connection information after confirming the connection states of the terminals that are connected to the network before the apparatus A 301 entered the power saving mode. In the case illustrated in FIG. 6, the apparatus A 301 stores connection information that indicates disengagement of the apparatus B 302 from the network. The apparatus A 301 also notifies a user of the disengagement of the apparatus B 302 from the network. In step F614, the apparatus A 301 ends the confirming process. The apparatus A 301 continues to operate as an access point because the apparatus C 303 is still connected to the network.

As described above, in the present exemplary embodiment, an access point confirms a connection state with one or more terminal apparatuses after the access point returns to the normal state (i.e., the active mode) from the power saving mode. Accordingly, the access point is able to detect disengagement of terminal apparatuses from the network that occurred during the power saving mode of the access point immediately after the returning to the normal state (i.e., the active mode) from the power saving mode. In addition, in the present exemplary embodiment, when the access point detects disengagement of all of the terminal apparatuses that have been connected to the network after the access point returns to the normal state (i.e., the active mode) from the power saving mode, the access point disconnects the network. This results in a quick disconnection of the network having no terminal apparatus connected thereto. Accordingly, device resources, for example, power consumption of the apparatus, can be saved. Further, the operations of the access point are stopped and the communication channel being used is released, which saves communication resources. The user of the access point can confirm the connection state of each terminal apparatus after the access point returns to the normal state (i.e., the active mode) from the power saving mode, improving user friendliness. Furthermore, when the access point is a mobile device such as a laptop or a smartphone, a user who detects disengagement of a terminal apparatus can immediately reconnect the terminal apparatus to the network when the user needs to communicate with the terminal apparatus.

While an exemplary embodiment of the present invention has been described, those descriptions are made only for an illustrative purpose, and not to be construed to limit the scope of the present invention to the exemplary embodiment. Various changes and modifications may be made without departing from the principles of the present invention. In those descriptions, the wireless LAN based on IEEE 802.11 series is used, but the present invention may be applicable to communication based on the other wireless communication systems such as Multi Band Orthogonal Frequency Division Multiplexing (OFDM) Alliance (MBOA), Bluetooth (trademark), and Ultra Wide Band (UWB), and the other wireless media such as ZigBee, the UWB including Wireless universal serial bus (USB), Wireless 1394, and Wireless Networks (WI-NET).

In the above exemplary embodiment, a group key exchange message is transmitted as a responses request to confirm a connection state, and a response from a terminal apparatus is used to confirm connection, but messages other than a group key exchange message may be used. Any message other than the group key exchange message that requests and receives a response from a terminal apparatus may be used. Examples of the message include wireless LAN action frame, RTS/CTS signal, PING message, and ARP message.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-265097 filed Nov. 29, 2010, which is hereby incorporated by reference herein in its entirety.

What is claimed is:

1. A base station that controls a wireless network, the base station comprising:
   a power control unit configured to switch the base station between an active state and a power saving state;
   a transmitting unit configured to transmit a predetermined signal to request a response from a communication apparatus to the communication apparatus, in response to the base station being switched from the power saving state to the active state,
   wherein the communication apparatus has been connected to the base station when the base station is switched from the active state to the power saving state; and
   a notification unit configured to notify a user of a connection state of the communication apparatus, based on a response to the predetermined signal by the transmitting unit in a case where the base station is switched from the power saving state to the active state.

2. The base station according to claim 1, further comprising a control unit configured to end operations for controlling of the wireless network in a case where there is no response to the predetermined signal transmitted by the transmitting unit,
   wherein the notification unit notifies the user of ending of the operations for controlling of the wireless network in a case where there is no response to the predetermined signal transmitted by the transmitting unit.

3. The base station according to claim 2, further comprising a determination unit configured to determine that there is no response to the predetermined signal transmitted by the transmitting unit in a case where the response to the predetermined signal is not received within a predetermined period.

4. The base station according to claim 1, wherein the power saving state is a state where the base station stops power supply to communication circuits incorporated in the base station.

5. The base station according to claim 1, wherein the base station communicates with the communication apparatus based on IEEE802.11 series.

6. The base station according to claim 1, further comprising:
   a second notification unit configured to notify the communication apparatus that the base station is operated in the power saving state,
   wherein the power control unit is configured to switch the base station from the active state to the power saving state after the second notification unit notifies the communication apparatus that the base station is operated in the power saving state.

7. A base station that controls a wireless network, the base station comprising:
   a power control unit configured to switch the base station between an active state and a power saving state;
   a transmitting unit configured to transmit a predetermined signal to request a response from a communication apparatus to the communication apparatus, in response to the base station being switched from the power saving state to the active state,
   wherein the communication apparatus has been connected to the base station when the base station is switched from the active state to the power saving state; and
   a control unit configured to end operations for controlling of the wireless network according to a response to the predetermined signal by the transmitting unit.

8. The base station according to claim 7, wherein the base station communicates with the communication apparatus based on IEEE802.11 series.

9. The base station according to claim 7, further comprising:
   a second notification unit configured to notify the communication apparatus that the base station is operated in the power saving state,
   wherein the power control unit is configured to switch the base station from the active state to the power saving state after the second notification unit notifies the communication apparatus that the base station is operated in the power saving state.

10. A method of controlling a base station that controls a network, the method comprising:
    switching the base station from an active state to a power saving state;
    storing information about a communication apparatus connected to the base station before switching the base station from the active state to the power saving state;
    transmitting a predetermined signal to request a response from a communication apparatus to the communication apparatus, in response to the base station being switched from the power saving state to the active state,
    wherein the communication apparatus has been connected to the base station when the base station is switched from the active state to the power saving state; and
    notifying a user of a connection state of the communication apparatus, based on a response to the predetermined signal in a case where the base station is switched from the power saving state to the active state.

11. A non-transitory computer-readable storage medium storing a program that causes a computer to execute the method according to claim 10.

12. A method of controlling a base station that controls a wireless network, the method comprising:
    switching the base station between an active state and a power saving state;
    transmitting a predetermined signal to request a response from a communication apparatus to the communication apparatus, in response to the base station being switched from the power saving state to the active state,
    wherein the communication apparatus has been connected to the base station when the base station is switched from the active state to the power saving state; and
    ending operations for controlling of the wireless network according to a response to the predetermined signal.

13. A non-transitory computer-readable storage medium storing a program that causes a computer to execute the control method according to claim 12.

* * * * *